Dec. 23, 1969　　A. CRONIG ET AL　　3,485,160

PHOTOGRAPHIC PROCESSING APPARATUS

Filed Feb. 2, 1967　　2 Sheets-Sheet 1

Alvin Cronig
Francois R. Gruber
INVENTORS.
BY John E. Toupal
ATTORNEY.

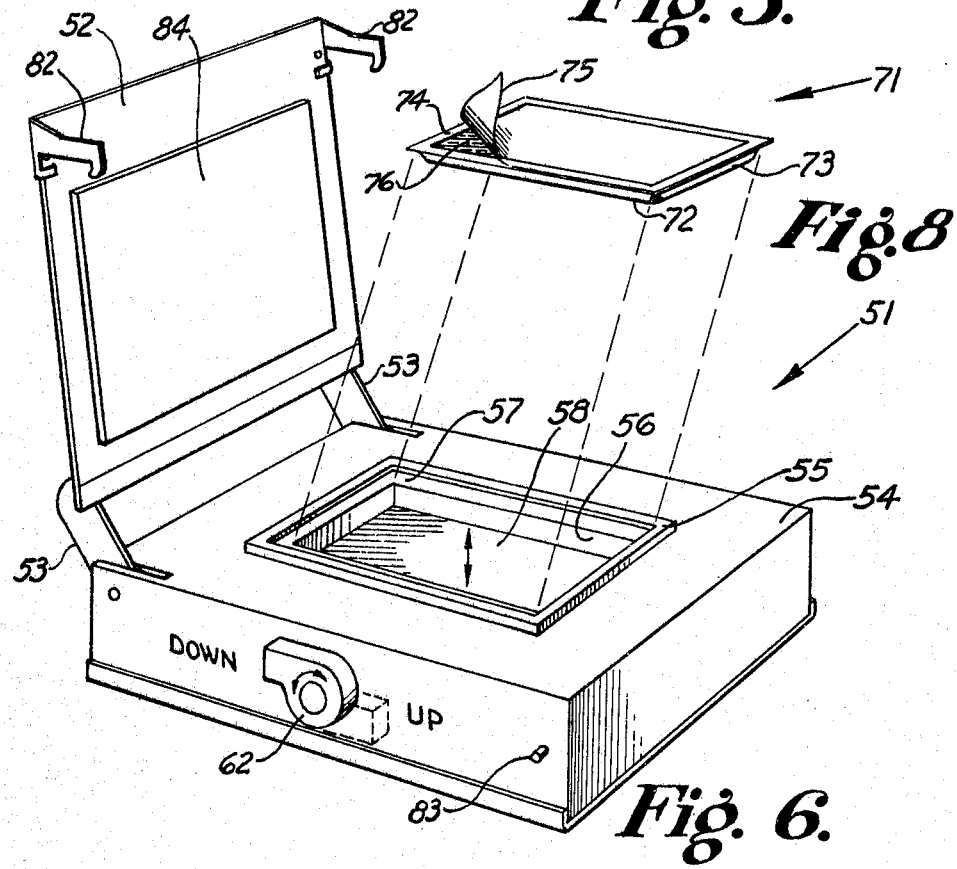

United States Patent Office

3,485,160
Patented Dec. 23, 1969

3,485,160
PHOTOGRAPHIC PROCESSING APPARATUS
Alvin Cronig, Lexington, and Francois R. Gruber, Wilmington, Mass., assignors to Itek Corporation, Lexington, Mass., a corporation of Delaware
Filed Feb. 2, 1967, Ser. No. 613,603
Int. Cl. G03d *3/16, 3/00*
U.S. Cl. 95—90          19 Claims

ABSTRACT OF THE DISCLOSURE

A photographic film processing apparatus having a housing, retainer, applicator and an actuator. The housing receives a frame of photographic film and the retainer secures the frame within the housing. The applicator supports a layer of processing reagent and the actuator is provided to coat the film with the processing reagent.

---

This invention relates generally to photographic film processing apparatus and more particularly relates to portable apparatus especially suited for processing aperture card mounted microfilm.

The now well known microfilm aperture card is a data processing card having an aperture in which a frame of microfilm is mounted. Typically, the mounted microfilm contains a graphic image of a previously photographed visual presentation and the card contains a key for locating the recorded information by, for example, electronic data processing computers. The ability of microfilm aperture cards to both handle total graphic information and to be quantitatively indexed has resulted in extremely efficient and extensive information management systems.

However, despite the many desirable features exhibited by aperture card systems, they have not come into extensive use because of other disadvantageous characteristics. Primary drawbacks have been the great complexity and relatively high cost of the presently available aperture card processing systems. These factors have limited the practical utility of the microfilm aperture card to extremely high volume information management systems. The same factors have limited the system principally to applications wherein the material being photographed can be brought directly to the aperture card camera and processing equipment. This latter requirement negates the potential usefulness of aperature cards for those applications wherein one desires a photographic record of a visual presentation which, as a practical matter, cannot be moved to a remote location and also desires to know immediately that a suitable photographic image of the presentation has been obtained. Such applications are multitude and include, for example, those instances in which one desires a photographic record of industrial equipment, prototype devices, blackboard presentations, etc.

The object of this invention, therefore, is to provide a compact and relatively inexpensive microfilm aperture card camera and processor system which can be conveniently and efficiently utilized to produce a photographic image of information wherever it may exist.

One feature of this invention is the provision of a portable photographic film processor adapted to receive and to fix the position of a single film frame within a lighttight housing and including an applicator adapted to support a layer of viscous processing reagent. The applicator is mounted for movement relative to the film frame so as to permit coating thereof with the viscous processing reagent. This unit permits convenient processing of exposed photographic film in any desired location and under a wide variety of environmental conditions.

Another feature of this invention is the provision of a film processor of the above featured type adapted to receive and to fix the position of a film frame which is mounted in an aperture card.

Another feature of this invention is the provision of a film processor of the above featured type wherein the applicator includes a substantially flat surface mounted parallel to the fixed film frame and adapted for reciprocal movement in a direction perpendicular thereto so as to permit application of the viscous processing reagent. With this structure, an individual and disposable viscous containing pod can be inserted onto the applicator surface and utilized when desired to develop a single film frame.

Another feature of this invention is the provision of a film processor of the above featured types wherein the viscous retaining pod is a shallow vessel having a removably sealed top wall, side walls conforming generally to the periphery of the retained film frame, and a flexible bottom wall adapted to flex toward the film frame and to apply the viscous reagent thereto in response to force exerted by the movable flat supporting surface of the applicator. Use of this unique processing reagent container permits processing of film in an extremely simple processing unit.

Another feature of this invention is the provision of a film processor of the above featured types wherein the lighttight housing includes a base unit in which applicator is mounted and a removable magazine in which the aperture is retained. The removable magazine provides a simple processor which is uniquely suited for use with a complementary camera unit also adapted to receive the removable magazine for exposure of the aperture card mounted film.

Another feature of this invention is the provision of a film processor of the above featured types wherein the base unit is adapted to support the removable magazine on a top surface having a recess which is aligned with the film frame and in which the applicator is movable in response to actuation by a manually operated lever mechanism. Because of the structural simplicity of this device, it can be manufactured at an extremely low cost.

These and other objects and features of the present invention will become apparent upon a perusal of the following specification taken in conjunction with the accompanying drawings wherein:

FIG. 5 is a cross-sectional view taken along the lines 5—5 in FIG. 4;

FIG. 6 is a perspective view of a film processor embodiment of the present invention;

FIG. 7 is a fragmentary, exploded, perspective view of an operating mechanism in the processor of FIG. 6; and FIG. 8 is a perspective view of a viscous processing reagent filled pod embodiment for use with the processor of FIG. 6.

Figure 1:
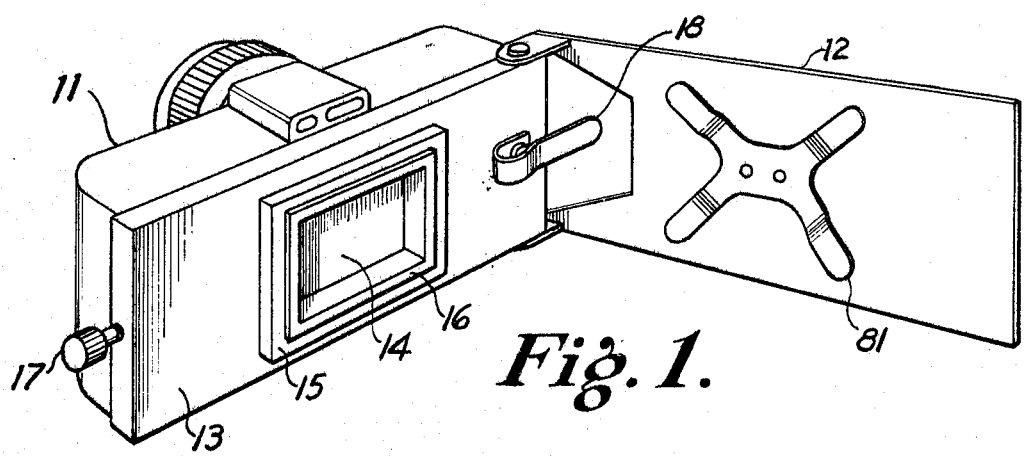
FIG. 1 is a perspective view of a camera embodiment of the present invention.

Referring now to FIG. 1, there is shown the camera 11 having the cover 12 pivotally connected to the camera back 13. Extending rearwardly of and surrounding an aperture 14 in the camera back 13 is the alignment frame 15 which encloses the movably mounted pressure frame 16. Attached to the camera back 13 are the threadedly engaged control screw 17 which upon actuation produces movement of the pressure frame 16 and the pivotable latch 18 for securing the cover 12 in a closed position.

Figure 2:
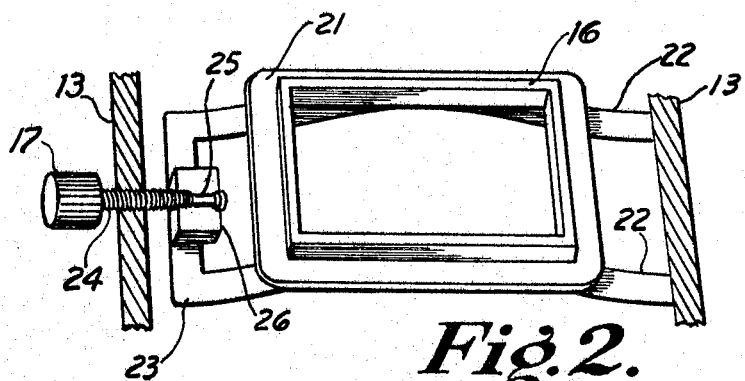
FIG. 2 is a fragmentary, perspective view of an operating mechanism in the camera of FIG. 1.

As shown in FIG. 2, the pressure frame 16 includes the outwardly extending base portion 21 adapted to engage the camera back's inner surface which surrounds the aperture 14. Supporting the base 21 are the arcuately shaped leaves 22 of the spring member 23. The threaded shaft 24 on the control screw 17 possesses an annular recess 25 closely fitted to a slot in the upwardly extending arm 26 of the spring member 23.

Figures 3, 4:
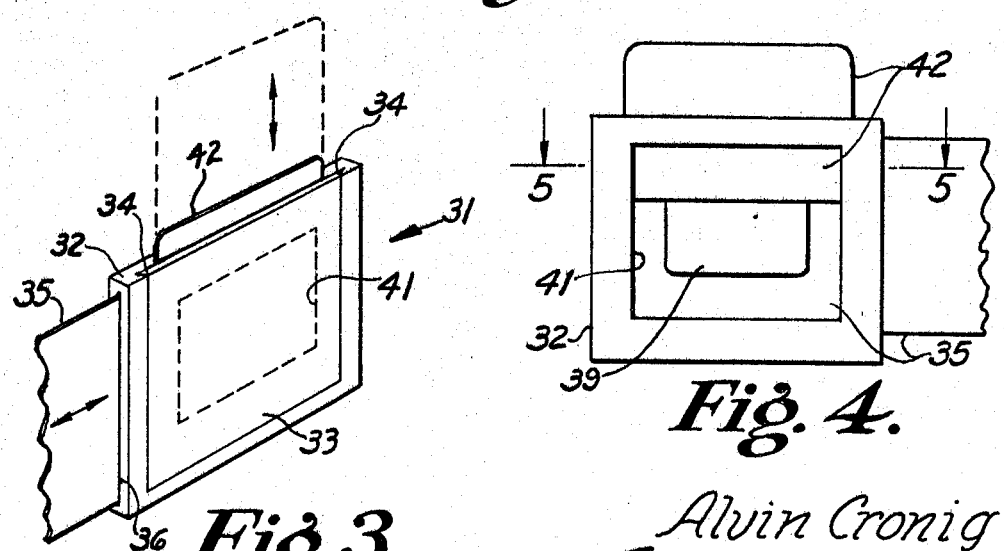
FIG. 3 is a perspective view of a film magazine embodiment of the present invention.
FIG. 4 is a front view of the magazine shown in FIG. 3 with a partially removed shutter.

FIGS. 3–5 show the magazine enclosure 31 formed by the front face 32 and back face 33 demountably engaged along the dovetailed joints 34. The magazine 31 is adapted to receive the film supporting aperture card 35 through the entry slot 36 in the side wall of the front face 32. The generally well known aperture card 35 is conventional and of the type, for example, disclosed in U.S. Patents Nos. 2,512,106 and 2,587,022. As shown in FIG. 5, the front face 32 has internal abutments 38 which fix the aperture card 35 in a position wherein the retained film frame 39 is aligned with the front face aperture 41. Slidably insertable into the magazine 31 between the film frame 39 and the aperture 41 is the shutter mechanism 42.

The processor base unit 51 shown in FIG. 6 has the cover plate 52 demountably attached with hinges 53. Projecting upwardly from the top surface 54 of the base unit 51 is the alignment frame 55 which surrounds the rectangular recess 56. The recessed shoulder 57 is formed along the inner periphery of the alignment frame 55. Mounted for vertical movement within the recess 56 is the applicator plate 58 having a planar top surface.

Shown in the fragmentary, exploded view of FIG. 7 is the actuating mechanism 61 for producing vertical, reciprocal movement of the applicator plate 58. The actuating mechanism 61 includes the actuator knob 62 fixed to the lever shaft 63 which is rotatably supported within a horizontal bearing aperture in the base unit 51. Attached to the end of the shaft 63 is the eccentric pin 64 which extends into a horizontal slot 65 in the applicator plate support column 66. A vertical bearing aperture in the base unit 51 supports and guides movement of the column 66. Because of the eccentricity of the pin 64, rotational movement of the knob 62 induces either an upward or a downward thrust on the column 66 and attached applicator plate 58.

FIG. 8 shows the film processing reagent container pod 71 adapted for use with the base unit 51 and the magazine 31. The shallow container vessel 71 is formed of a suitable flexible material which permits relative movement between the vessel's bottom wall 72 and side walls 73 which conform generally to the outer periphery of the film frame 39. Extending outwardly from the side walls 73 is the flange portion 74 to which is removably sealed the top wall 75. The viscous processing reagent 76 contained by the vessel 71 can comprise any conventional mono-bath processing solution to which has been added a compatible thickening substance. Suitable thickeners include, for example, natural and synthetic polysaccharides, enzymes, starches, thermoplastic and thermosetting acrylic resins, etc.

During typical operation of the invention, the threaded shaft 24 is screwed outwardly reducing the pressure applied to the spring member 23 allowing elongation of the leaf members 22. This reduces the height of the leaf members 22 and lowers the supported base 21 to a position wherein the outer edge of the pressure frame 16 is about flush with the outer edge of the alignment frame 15. The magazine 31 containing an aperture card 35 with an unexposed film 39 and with the shutter mechanism 42 inserted, is then placed over the camera aperture 14. Proper alignment of the magazine 31 is obtained by fitting the alignment frame 15 into the closely fitting aperture 41 in the magazine front face 32. The closely fitted frame 16 and aperture 41 also provide a light shield for the film frame 39 after removal of the shutter mechanism 42. The cover 12 is closed and locked in position by rotation of the latch member 18 causing the spring members 81 to exert a restraining force on the back face 33 of the magazine 31. After removal of the shutter mechanism 42, the threaded shaft 24 is screwed inwardly increasing the compressive force applied to the spring member 23 and raising the pressure frame 16 which engages the aperture card surface surrounding the film fame 39. When the base 21 engages the inner surface of the camera back 13 preventing further movement of the pressure frame 16, optimum spacing will exist between the camera lens and the film frame 39. The camera 11 is then utilized in a conventional manner to expose the film frame 39 producing thereon a desired image. Subsequently, the control screw 17 is again operated to retract the pressure frame 16 and allow re-insertion of the shutter mechanism 42 thereby light-sealing the film 39 before opening of the cover 12 and removal of the magazine 31.

The container vessel 71 is prepared for the processing operation by removal of a sealed top wall 75 to expose the viscous processing agent 76. The vessel 71 is then inserted in the recess 56 where it is supported from the shoulder 57 by the flanged portion 74. Since the thickness of the flanged portion 74 and the depth of the shoulder recess 57 are substantially equal, the top surface of the flanged portion 74 is flush with the top surface of the alignment frame 55.

The magazine 31 containing the exposed film frame 39 is then placed on the top surface 54 of the base 51. As above, proper alignment is obtained by positioning the alignment frame 55 into the closely conforming aperture 41. The cover 52 is closed and secured by sliding the latch members 82 over the latch pins 83 resulting in the exertion of a uniform pressure on the magazine back face 33 by the resilient mat 84.

After removal of the shutter 42 the actuator knob 62 is rotated in a clockwise direction inducing upward movement of the applicator plate 58 which engages the bottom wall 72 of the vessel 71. As the vessel 71 is lifted by movement of plate 58, the flanged portion 74 contacts the aperture card 35 surface surrounding the exposed film frame 39. Further movement of the plate 58 causes the vessel's bottom wall 72 to flex upwardly and press the viscous processing reagent 76 against the film frame 39. The applicator plate 58 is maintained in this upward position for a period of time, typically about 15 seconds, sufficient to develop the image on the film frame 39 and then lowered into its retracted position by counter-clockwise rotation of the actuator knob 62.

The cover 52 is then opened and the aperture card 35 withdrawn from the magazine 31 to permit removal of the excess processing reagent 76 from the film frame 39. For this cleaning operation, it is preferable that the magazine back face 33 be detachable, as shown, so that the aperture card 35 can be withdrawn through the large opening provided by removal of the back face 33. This eliminates the possibility of smearing the aperture card 35 with the excess processing reagent 76 during passage of the film frame 39 through the narrow entry slot 36. After completion of the processing operation, the used vessel 71 is removed from the base unit 51 and discarded. Finally, the fully processed aperture card 35 is keyed by the application of some form of identifying indicia. Any conventional keying method can be used including, for example, the mere application of a printed code or punching if the card is to be used with electronic data processing equipment.

Thus, the present invention provides an extremely simple and compact photographic film processor which can be conveniently utilized in any desired location and under a wide variety of environmental conditions. As illustrated, the invention is particularly useful in conjunction with information management systems because of its unique suitability for processing microfilm aperture cards. In this regard, particular effectiveness is obtained by the utilization of a viscous processing reagent which adds greatly to the flexibility and simplicity of the system.

Obviously, many modifications and variations of the present invention are possible in light of the above teachings. For example, the invention can be effectively utilized for processing other than aperture card mounted film. Also, although the illustrated, manually operated processor unit is desirable because of its simplicity, it will be obvious that the basic concepts of the invention could be incorporated into an automatic or semi-automatic device. It is, therefore, to be understood that the invention may be practiced otherwise than as specifically described.

What is claimed is:

1. A portable photographic film processor apparatus comprising:
   (a) a lighttight housing means to receive a single frame of photographic film;
   (b) said housing means having a recess;
   (c) frame alignment means located adjacent said recess to fix the film frame in one given position within said housing;
   (d) an applicator means comprising a substantially flat surface located in said recess substantially parallel to the fixed film frame to support a layer of thickened processing reagent; and
   (e) actuator means to coat the film frame with the thickened processing reagent by producing relative reciprocal movement of said flat surface in a direction substantially perpendicular thereto to press the layer of thickened reagent against the film.

2. A portable photographic film processor apparatus comprising:
   (a) a lighttight housing means to receive a single frame of photographic film;
   (b) retainer means to fix the film frame in a given position within said housing;
   (c) an applicator means to support a layer of thickened processing reagent;
   (d) said applicator means comprising a substantially flat surface movably mounted in a position substantially parallel to the film frame;
   (e) said applicator means further comprising a shallow vessel containing the thickened processing reagent, said shallow vessel having a removable top wall, side walls conforming generally to the periphery of the film frame, and flexible bottom wall means to move said thickened processing reagent into contact with the film frame after removal of said top wall and in response to force exerted on said bottom wall by said flat surface during movement thereof; and
   (f) actuator means to coat the film frame with the thickened processing reagent by producing reciprocal movement of said flat surface relative to the film frame in a direction substantially perpendicular thereto to press the layer of thickened reagent against the film.

3. A portable photographic film processor apparatus according to claim 2 wherein said shallow vessel includes a flange portion having an upper surface sealed to said top wall and adapted after removal thereof to engage a vessel retaining surface surrounding the film frame during movement of said flat surface.

4. A portable photographic film processor according to claim 3 wherein said lighttight housing comprises a base unit in which said applicator and said actuator means are mounted, and a removable magazine to enclose the film frame.

5. A portable photographic film processor apparatus according to claim 4 wherein said magazine is a relatively thin enclosure having an apertured front face adapted to expose an enclosed film frame and including a shutter mechanism slidable engaged with said enclosure to selectively open and close said apertured front face.

6. A portable photographic film processor apparatus according to claim 5 wherein said enclosure further comprises a back face demountably attached to said front face.

7. A portable photographic processor apparatus according to claim 6 wherein said base unit includes magazine alignment means to fix the position of said magazine so as to align the aperture in said apertured face with said movable flat surface.

8. A portable photographic processor apparatus according to claim 7 wherein said base unit includes a top surface to support said magazine and having a recess in which said flat surface is movably mounted, and a demountable resilient cover plate adapted in a closed position to exert a force against the back face of said enclosure.

9. A portable photographic processor apparatus according to claim 8 wherein said actuator means comprises a manually operable lever connected to said flat surface to produce said movement thereof.

10. A portable photographic film processor apparatus comprising:
    (a) a lighttight housing means to receive a single frame of photographic film mounted in an aperture card;
    (b) retainer means to fix the film frame in a given position within said housing;
    (c) applicator means to support a layer of thickened processing reagent;
    (d) said applicator means comprising a substantially flat surface movably mounted in a position substantially parallel to the fixed film frame;
    (e) said applicator means further comprising a shallow vessel containing the thickened processing reagent, said shallow vessel having a removable top wall, side walls conforming generally to the periphery of the film frame, and a flexible bottom wall means to move said thickened processing reagent into contact with the film frame after removal of said top wall and in response to force exerted on said bottom wall by said flat surface during movement thereof;
    (f) actuator means to coat the film frame with the thickened processing reagent by producing reciprocal movement of said flat surface relative to the film frame in a direction substantially perpendicular thereto to press the layer of thickened reagent against the film; and
    (g) said lighttight housing comprising a base unit in which said applicator and said actuator means are mounted, and a removable magazine to enclose the film frame.

11. A portable photographic film processor apparatus according to claim 10 wherein said shallow vessel includes a flange portion having an upper surface sealed to said top wall and adapted after removal thereof to engage the aperture card surface surrounding the film frame during movement of said flat surface.

12. A portable photographic film processor apparatus according to claim 11 wherein said magazine is a relatively thin enclosure having an apertured front face to expose an enclosed film frame and including a shutter mechanism slidably engaged with said enclosure to selectively open and close said apertured front face.

13. A portable photographic processor apparatus according to claim 12 wherein said base unit includes magazine alignment means to fix the position of said magazine so as to align the aperture in said apertured face with said movable flat surface.

14. A portable photographic processor apparatus according to claim 13 wherein said base unit includes a top surface to support said magazine and having a recess in which said flat surface is movably mounted, and a demountable resilient cover plate adapted in a closed position to exert a force against the back face of said enclosure.

15. A portable photographic processor apparatus according to claim 14 wherein said actuator means comprises a manually operable lever connected to said flat surface to produce said movement thereof.

16. A photographic film processor apparatus comprising:
 (a) a lighttight housing means to receive an aperture card mounted film frame;
 (b) retainer means to secure the aperture card so as to fix the film frame in a given position within said housing means;
 (c) reservoir means to contain within said housing a supply of thickened processing reagent;
 (d) applicator means to coat the surface of the film frame with the thickened processing reagent by producing relative movement therebetween to press the layer of thickened reagent against the film; and
 (e) said reservoir means comprising a shallow vessel containing the thickened processing reagent, said shallow vessel having a removable top wall, side walls conforming generally to the periphery of the film frame, and a flexible bottom wall means to move said thickened processing reagent into contact with the film frame after removal of said top wall and in response to force exerted on said bottom wall by said applicator means.

17. A portable photographic film processor according to claim 16 wherein said lighttight housing comprises a base unit in which said applicator is mounted, and a removable magazine to retain said aperture card.

18. A portable photographic film processor apparatus according to claim 17 wherein said magazine is a relatively thin enclosure having an apertured front face to expose the enclosed film frame and including a shutter mechanism slidably engaged with said enclosure to selectively open and close said apertured front face.

19. A photographic film processor apparatus comprising:
 (a) a lighttight housing means to receive photographic film;
 (b) retainer means to receive the photographic film in a given position within said housing means;
 (c) applicator means to support a layer of thickened processing reagent in a plane substantially parallel to the photographic film;
 (d) said applicator means comprising a disposable vessel containing the layer of thickened processing reagent and supported on a reciprocative surface, said disposable vessel including a removable top wall, side walls conforming generally to the film surface being processed, and a bottom wall means to move said thickened processing reagent into contact with the film after removal of said top wall and in response to movement of said reciprocative surface; and
 (e) actuator means to produce contact resulting relative movement between the photographic film and the layer of thickened processing reagent along a path substantially perpendicular thereto to press the layer of thickened reagent against the film.

References Cited

UNITED STATES PATENTS

| 2,572,357 | 10/1951 | Land | 95—13 |
| 2,580,720 | 1/1952 | Bass | 95—13 |
| 3,350,990 | 11/1967 | Finelli et al. | 95—13 |

FOREIGN PATENTS 470,197 8/1937 Great Britain.

NORTON ANSHER, Primary Examiner

CHARLES E. SMITH, Assistant Examiner

U.S. Cl. X.R.

95—89